(12) United States Patent  (10) Patent No.: US 6,739,632 B1
Thomas et al.  (45) Date of Patent: May 25, 2004

(54) METHOD AND APPARATUS FOR COUPLING HVAC CONDUITS

(75) Inventors: Bradley L. Thomas, Garner, NC (US); Jonathan M. Thomas, Garner, NC (US)

(73) Assignee: Hamlin Sheet Metal, Incorporated, Garner, NC (US)

( * ) Notice: Subject to any disclaimer, the term of this patent is extended or adjusted under 35 U.S.C. 154(b) by 64 days.

(21) Appl. No.: 09/961,731

(22) Filed: Sep. 24, 2001

(51) Int. Cl.[7] ............................................... F16L 37/12
(52) U.S. Cl. ................... 285/339; 138/DIG. 4; 285/342; 285/915
(58) Field of Search ................... 138/DIG. 4; 285/370, 285/339, 342, 230, 915

(56) References Cited

U.S. PATENT DOCUMENTS

| | | | |
|---|---|---|---|
| 535,236 A | 3/1895 | Anderson | |
| 651,134 A | 6/1900 | Dickens | |
| 2,264,815 A | 12/1941 | Thomson | |
| 2,574,625 A | 11/1951 | Coss | |
| 3,032,358 A | 5/1962 | Rolston | |
| 3,955,834 A | * 5/1976 | Ahlrot | 285/110 |
| 4,040,651 A | 8/1977 | LaBranche | |
| 4,050,703 A | * 9/1977 | Tuvesson et al. | 277/615 |
| 4,120,521 A | 10/1978 | Parmann | |
| 4,186,932 A | 2/1980 | Emhardt et al. | |
| 4,216,981 A | * 8/1980 | Jensen | 285/97 |
| 4,538,822 A | * 9/1985 | Beacom | 277/615 |
| 4,603,890 A | 8/1986 | Huppee | |
| 4,664,421 A | * 5/1987 | Jones | 277/615 |
| 5,092,633 A | * 3/1992 | Burkit | 285/109 |
| 5,388,871 A | 2/1995 | Saitoh | |
| 5,531,460 A | * 7/1996 | Stefansson et al. | 277/615 |
| 5,687,997 A | * 11/1997 | Beacom | 285/94 |
| 5,921,592 A | 7/1999 | Donnelly | |
| 6,170,883 B1 | * 1/2001 | Mattsson et al. | 285/110 |
| 6,176,523 B1 | * 1/2001 | Winslett | 285/24 |
| 2002/0153725 A1 | * 10/2002 | Myers | 285/370 |

FOREIGN PATENT DOCUMENTS

| | | |
|---|---|---|
| DE | 28 40 962 A1 | 4/1979 |
| DE | ED3141114 | 8/1982 |
| DE | 4037085 | 5/1992 |
| DE | 4107993 | 9/1992 |
| EP | 0389462 | 3/1990 |

* cited by examiner

*Primary Examiner*—Eric K. Nicholson
(74) *Attorney, Agent, or Firm*—Coats & Bennett, P.L.L.C.

(57) ABSTRACT

A coupling for connecting one or more pipes or conduits. The coupling includes at least one wedge-shaped gasket extending around the coupling. The wedge-shaped gasket includes an outer sloped or inclined surface, an inner surface, and a pair of opposed ends where one end is higher than the other. In use, a pipe, duct or conduit is inserted over one end portion of the coupling such that as the pipe or conduit is moved or slipped over the wedge-shaped gasket, the gasket compresses and forms a seal between the coupling and a portion of the inner surface of the pipe or conduit.

15 Claims, 5 Drawing Sheets

METHOD AND APPARATUS FOR COUPLING HVAC CONDUITS

FIELD OF THE INVENTION

The present invention relates to HVAC systems and, more particularly, to couplings for interconnecting conduits or pipes that channel air through portions of an HVAC system.

BACKGROUND OF THE INVENTION

In HVAC systems, particularly commercial systems, air is channeled or directed from one part of the system to another part by conduits such as spiral ducts. These ducts have to be connected. Generally, these spiral ducts are connected by various forms of couplings or connectors. To seal the joints between the spiral ducts and the couplings, it is common practice to apply a sealant material between the end of the coupling and the end of the spiral duct. Once the sealant material has been applied to the joint and the spiral duct has been slipped onto a coupling, it is common practice to mechanically secure the spiral duct to the coupling by screws. While this approach to coupling and sealing spiral ducts is generally acceptable, there is a need in the HVAC field, especially in commercial applications, to provide a coupling system for interconnecting HVAC ducts that is self-sealing and which promotes efficient air movement through the HVAC system.

SUMMARY OF THE INVENTION

The present invention entails a coupling for connecting one or more pipes or conduits together. The coupling comprises at least one wedge-shaped gasket disposed around the coupling. The wedge-shaped gasket includes an outer surface or face that faces from one end to the other end, and an inner surface that lies adjacent the coupling. In operation, an end of a pipe, duct or conduit is inserted over the pipe coupling and moved with respect to the pipe coupling such that the conduit, duct or pipe is slipped over the wedge-shaped gasket. In the process, the inner surface of the pipe, duct or conduit engages the wedge-shaped gasket and compresses the same forming the seal between the coupling and the inner surface of the pipe or conduit.

In one particular embodiment, the present invention provides an HVAC coupling for coupling HVAC ducts or conduits together. The HVAC coupling includes a pair of opposed ends and a raised bead extending around the pipe coupling between the ends. A pair of gasket seats are formed on opposite sides of the bead, each gasket seat including a circumferential indention formed in and extending around the pipe coupling. A wedge-shaped gasket is disposed in each gasket seat and extends around the pipe coupling. Each wedge-shaped gasket includes an outer face or surface that is inclined downwardly towards an adjacent end of the coupling. In use the coupling is adapted to be connected to each of the pipes by sliding an end portion of the pipe over an end of the pipe coupling. More particularly, the pipe is moved over the wedge-shaped gasket extending around the coupling causing the wedge-shaped gasket to compress and form a seal between the pipe and the pipe coupling.

In another embodiment of the present invention, there is provided a method for coupling conduits of an HVAC system together. This method includes inserting one end of an HVAC conduit over an end portion of a coupling. Further, the conduit is moved relative to the coupling such that the inner surface of the conduit engages and slips over a wedge-shaped gasket extending around a portion of the coupling. As the conduit is slipped over the wedge-shaped gasket, the gasket is compressed forming a seal between the coupling and the conduit.

DESCRIPTION OF THE INVENTION

Figure 1:
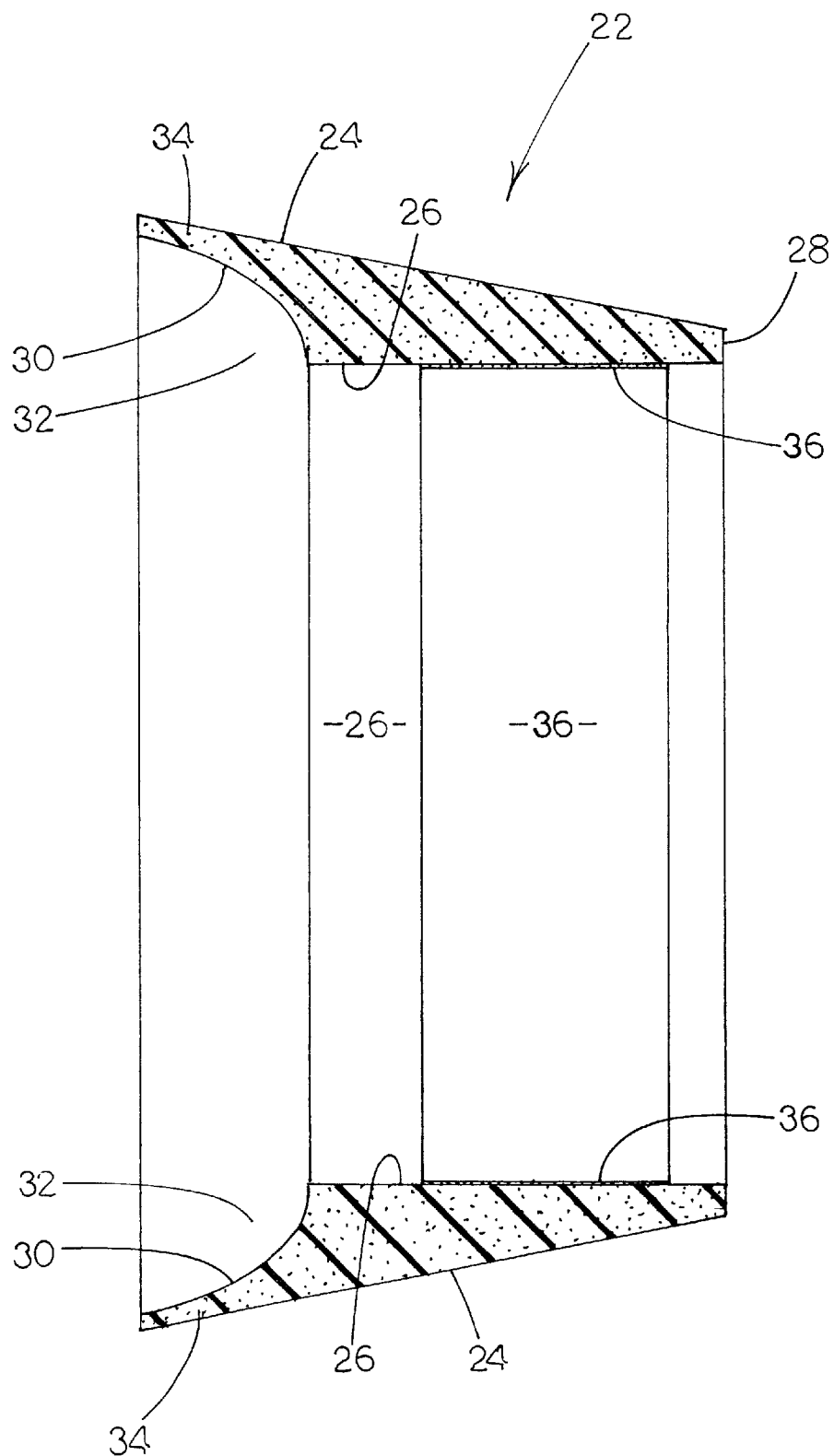
FIG. 1 is a cross-sectional view of the wedge-shaped gasket of the present invention.

With further reference to the drawings, the coupling of the present invention is shown therein and indicated generally by the numeral 10. As will be appreciated from subsequent portions of this disclosure, coupling 10, which may be referred to as a pipe coupling or a conduit coupling for example, is adapted to interconnect conduits, ducts or pipes indicated generally by the numeral 12. It should be appreciated that the coupling 10 may be provided in various forms. In the end, the term "coupling" means a structure for interconnecting two or more conduits or pipes together. The coupling may be a simple straight coupling as illustrated in the drawings herein. Further, the coupling can be in the form of a "Y", a cross, a "T" or a lateral. Although coupling 10 may have a variety of applications, it is contemplated that one primary application would be in HVAC systems. More particularly, in HVAC systems, such as commercial systems, there is provided an array or series of conduits or ducts (such as spiral ducts) 12 that carry air from one location in the system to another. In such HVAC systems, the coupling 10 can be used to couple the ducts or conduits 12 used to channel air through the system.

Figure 2:
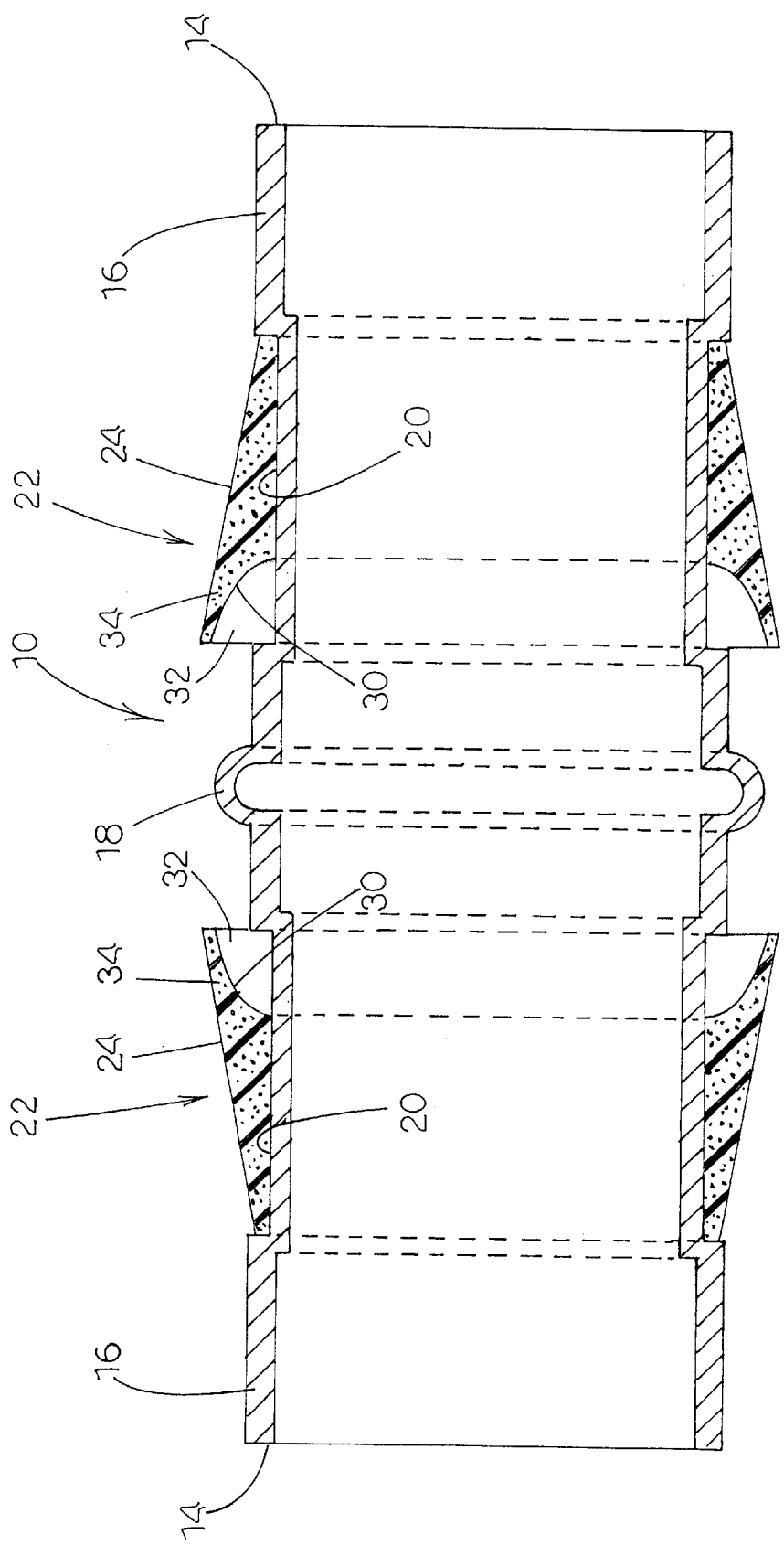
FIG. 2 is a longitudinal sectional view of the coupling of the present invention showing two wedge-shaped gaskets incorporated therein.

Turning to a discussion of the coupling 10, it is seen from FIG. 2 that the coupling includes a pair of opposed ends 14 and a pair of opposed end portions 16. Centrally located on the coupling 10 is a bead 18 that extends circumferentially around the coupling. Disposed on opposite sides of the bead 18 is a circumferential gasket seat 20. Gasket seat 20 in the embodiment shown herein, is formed by an indention that extends around the coupling 10. That is, in manufacturing or forming coupling 10 an indention is formed in the structure of the coupling that forms the gasket seat 20.

Secured to the pipe coupling 10 is a pair of wedge-shaped gaskets, each being indicated generally by the numeral 22. Gaskets 22 are constructed of a rubber material that exhibits properties of compressibility and resiliency. Although the specific material used to form the gasket 22 may vary, it is contemplated that in one embodiment the gasket 22 would be manufactured by extruded neoprene. As will be understood from subsequent portions of this disclosure, the gaskets 22 function to form a generally air-tight seal between the coupling 10 and one or more ducts or conduits 12 that may be connected thereto. As noted above, gasket 22 assumes a wedge-shape. As seen in the drawings, when the gasket 22 is fitted onto the coupling 10, the gasket becomes thicker or its height increases, as one moves towards the bead 18 of the coupling 10. In other words, the thickest portion of the gasket 22 faces the central portion or bead 18 of the coupling 10.

Viewing each wedge-shaped gasket 22 in more detail, it is seen that each gasket includes an outer face or surface 24. As shown in the drawings, the outer surface 24 slopes or is disposed at an incline. Formed on the opposite side of the gasket 22 is an inner surface 26. It is the inner surface 26 that either engages the coupling 10 or is disposed closely adjacent thereto. Gasket 22 includes a pair of ends, a first end referred to by numeral 28 and a second end referred to by numeral 30. It is seen from the drawings that the first end 28 is of a height less than the height of the second end 30. As viewed in FIG. 1, it is seen that the second end 30 assumes a generally concave-shape. This concave-shaped end 30 defines an open space of 32 that generally lies under an upper portion or upper tip area 34 of the gasket 22. Finally, the wedge-shaped gasket 22 includes a thin pressure sensitive adhesive strip or tape 36 that is secured to at least a portion of the inner surface 26. This adhesive strip 36 functions to secure the wedge-shape gasket 22 to the gasket seat 20 of coupling 10.

It is appreciated that the wedge-shape gasket 22 is in the form of a ring as it extends around the outer surface of the coupling 10. More particularly, each wedge-shape gasket 22 is seated within an indented gasket seat 20 discussed above. The presence of the adhesive strip 36 acts to secure the gasket 22 to the indented gasket seat 20. It should be appreciated that the gasket seat may not be required to be indented. However, it is contemplated that in a preferred embodiment that the indention of the gasket seat may enhance the performance of the gasket 22 and may tend to stabilize the gasket 22 once it is secured to the coupling 10. The depth of the gasket seat 20 can vary. However, in a preferred embodiment it is contemplated that the depth of the gasket seat 20 would be at least the height of the first end 28 of the gasket 22. In some cases it is contemplated that the depth of the gasket seat 20 would be slightly greater than the height of the first end 28. This will enable conduits or pipes 12 to be easily slipped over the first end 28 of the gasket 22. The other end of the gasket, that is, the concave-shaped end 30 is of a height greater than the depth of the indention that forms the gasket seat 20.

The term "wedge-shape" as used herein means the height of the gasket 22, as viewed in FIG. 1 for example, varies from one end of the gasket to the other end. In the preferred embodiment illustrated herein, the height variation is shown as an incline or a slope. However, it should be appreciated that the variation does not have to be on an incline or a slope or a linear or proportional variation.

Figure 3:
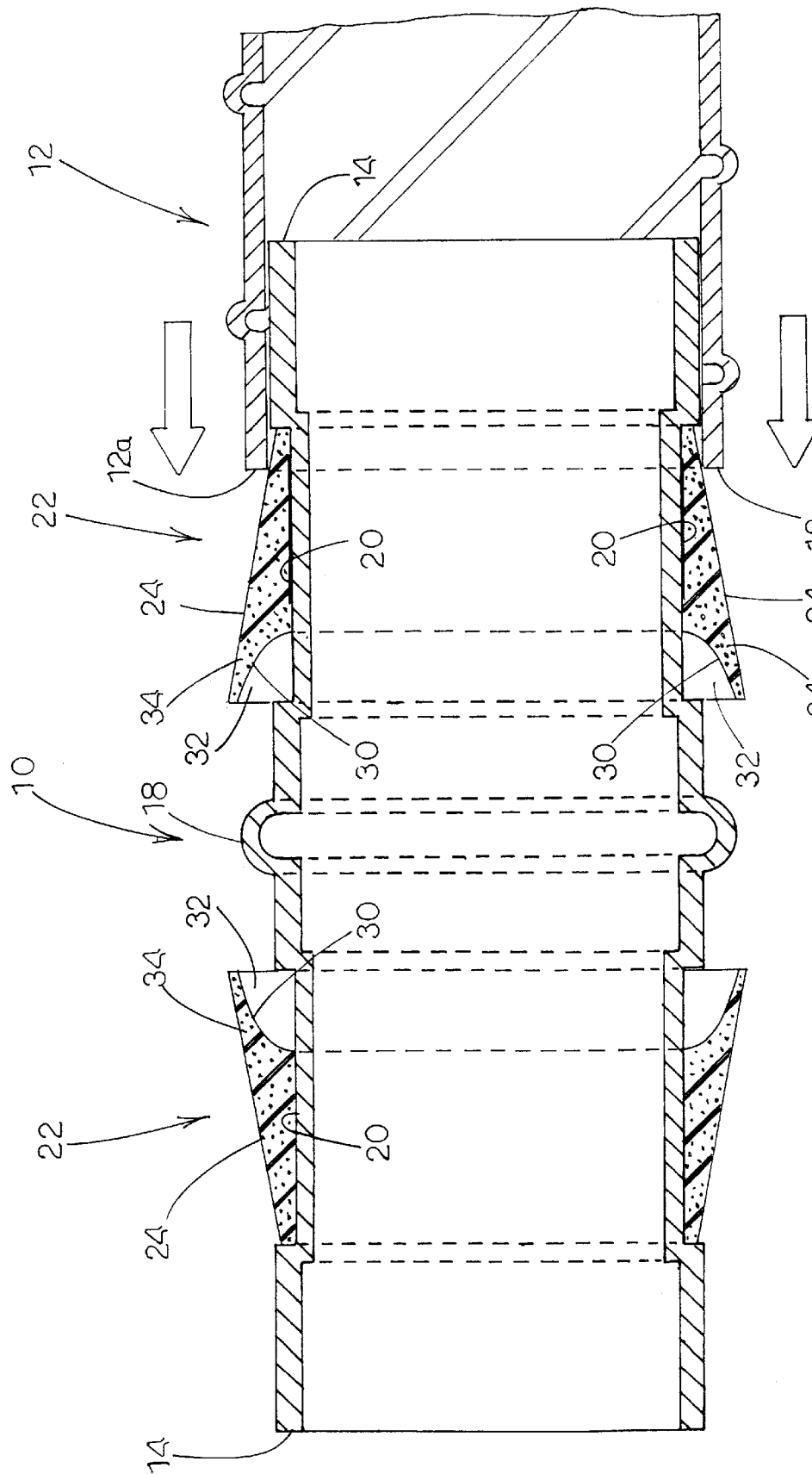
FIG. 3 is a cross-sectional view illustrating a conduit or duct being inserted onto the coupling.
Figure 4:
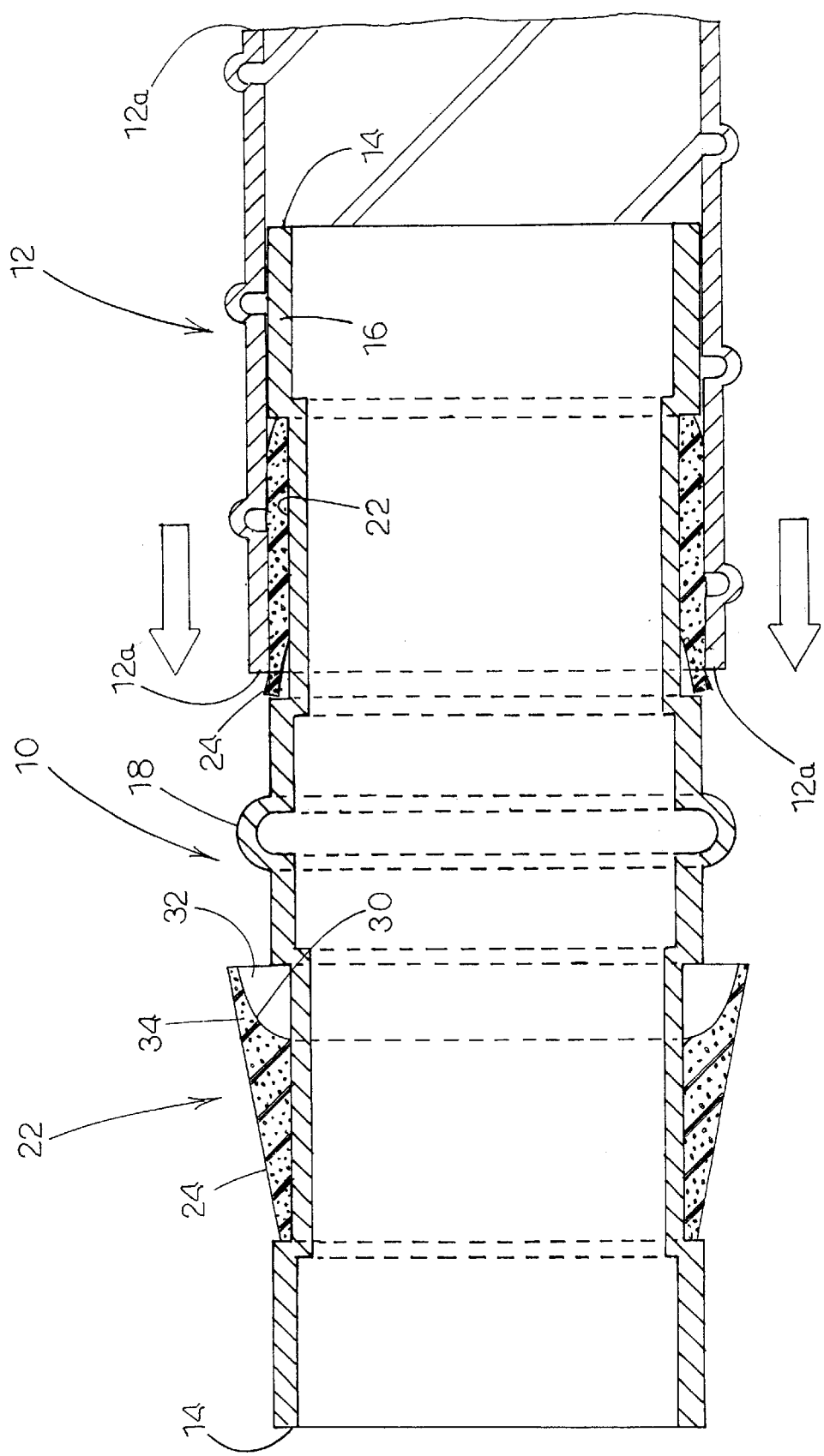
FIG. 4 is a sectional view illustrating the conduit of FIG. 3 being further moved onto the coupling.
Figure 5:
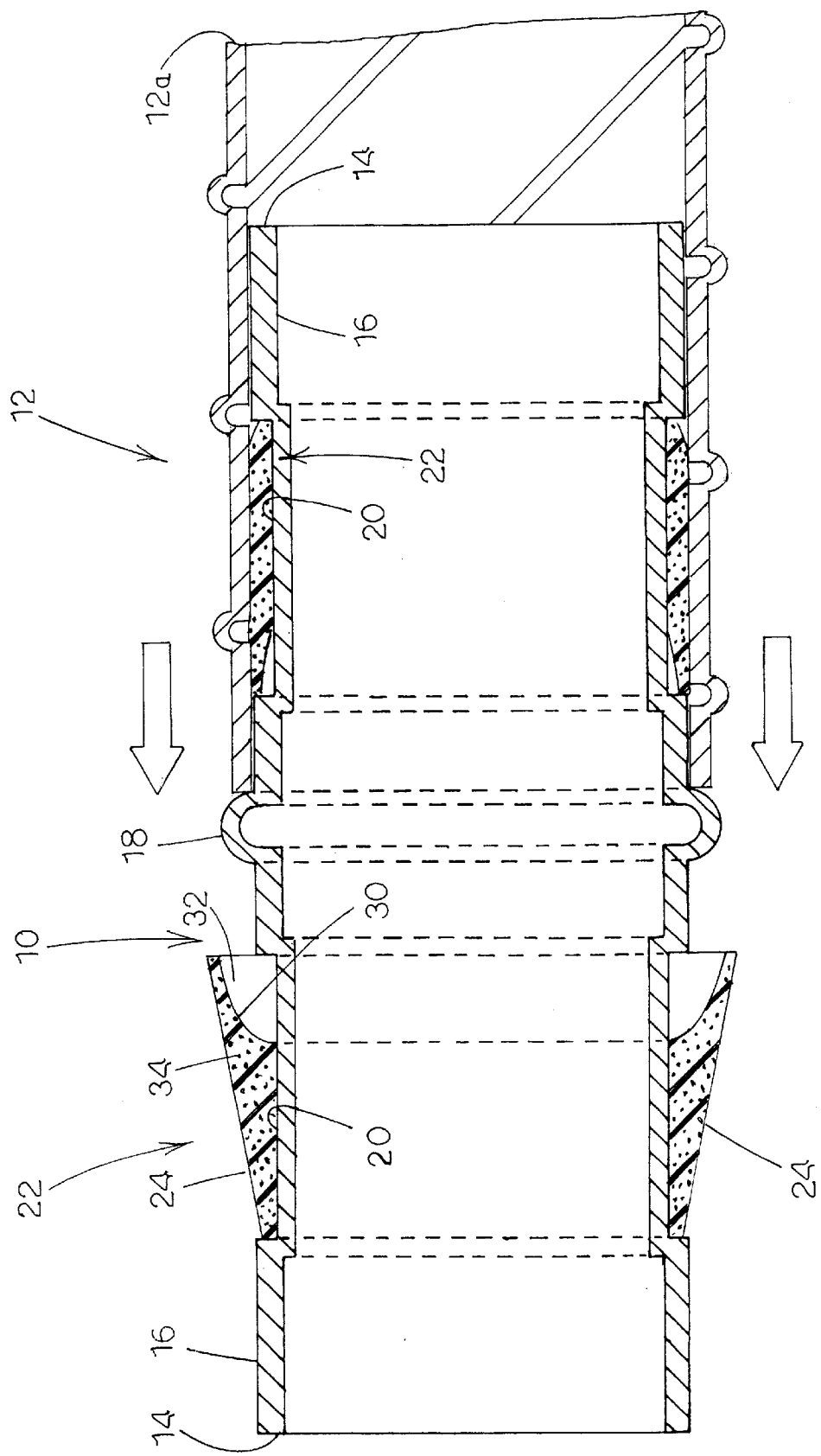
FIG. 5 is a view similar to FIGS. 3 and 4 but wherein the conduit has been moved further from the position shown in FIG. 4 to where the end of the conduit abuts against a bead formed on the coupling.

In use, coupling 10 is adapted to connect two conduits or ducts 12 such that, in the case of an HVAC system, air is transferred from one duct through the coupling 10 into the other duct. FIGS. 3–5 show a conduit or duct 12 being connected to coupling 10. For purposes of explanation, conduit 12 includes an end 12a. Also, it should be appreciated that in HVAC systems, the duct 12 would sometimes be of a spiral construction and are sometimes referred to as spiral ducts. In any event, as viewed in FIG. 3, note that the end 12a of the conduit or spiral duct 12 is extended over the end 14 of the coupling 10 and is extended to where the end 12a of the conduit has been moved or slipped past the first end 28 of the wedge-shaped gasket of 22. From this point, the conduit 12 is continued to be moved towards the bead 18 of the coupling 10. In this process, the end 12a and the inner surface of the conduit about the end 12a is continued to be slipped or moved over the gasket 22 and particularly moved over the outer surface 24 of the gasket 22. Preferably at some point, such as during the manufacturing process, the outer surface or face 24 of the gasket 22 is lubricated. This facilitates the sliding of the inner surface of a conduit or duct 12 over the wedge 22. Because of the wedge-shape of the gasket 22 it is appreciated that as the conduit 12 moves from the position shown in FIG. 3 to the position shown in FIG. 4 that the wedge-shape gasket 22 will be compressed. The upper hip area 34 of the gasket 22 will tend to be compressed downwardly towards the coupling and will tend to curl under and occupy the space of 32 that is formed by the concave-shaped end 30 of the gasket when it assumes an uncompressed mode such as that shown in FIG. 1.

From the position shown in FIG. 4, the conduit 12 is further pushed or moved towards the bead 18. Finally, as shown in FIG. 5, the end 12a of the conduit 12 abuts against the edge of the bead 18. At this point, the wedge-shaped gasket 22 has formed a generally air-tight seal between the coupling 10 and the surrounding inner surface of the conduit 12. This is particularly the result of the gasket 22 being in the shape of a wedge. After the conduit 12 has been slipped over the wedge-shaped gasket 22 to the extent that the end 12a abuts against the bead 18 of the coupling 10, then the conduit 12 can be further secured to the coupling 10 by mechanical fasteners such as screws.

It is appreciated that the coupling 10 may assume different configurations. In the case of the present embodiment illustrated, the coupling 10 is simply be adapted to interconnect two pipes, conduits or ducts. However, it is appreciated that couplings can be designed to connect one or more conduits or pipes.

There are many advantages to the coupling 10 of the present invention and particularly to the use of the wedge-shaped gasket 22 in conjunction with the coupling 10. First, the wedge-shaped gasket 22 forms a generally air-tight seal. Secondly, the wedge shaped gasket 22 functions to self-center the conduit or duct with respect to the coupling 10. All of this results in less friction loss and better air performance, especially in the areas where the coupling 10 connects two ducts or conduits together.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. An HVAC duct coupling for connecting one or more HVAC ducts, said duct coupling comprising:

a. at least one end;

b. a raised bead extending around the duct coupling adjacent the end;

c. a gasket seat formed on one side of the bead and including a circumferential indention formed in and extending around the duct coupling;

d. a gasket disposed in the gasket seat and extending around the duct coupling, said gasket including an outer surface;

e. the gasket normally assuming a wedge-shaped and an expanded configuration when the duct coupling assumes an uncoupled state, and assuming a compressed configuration when the duct coupling assumes a coupled state;

f. wherein the gasket includes an inner surface that rests adjacent the gasket seat and wherein when the gasket assumes the expanded configuration the outer surface of the wedge-shaped gasket is inclined downwardly toward the adjacent end of the duct coupling, and projects past the inner surface such that an open area is defined below a portion of the outer surface;

g. wherein when the duct coupling assumes a coupled state and is connected to at least one duct, the gasket lies between the duct coupling and the duct in the compressed configuration and forms a seal between the duct coupling and the duct; and h. wherein when in the compressed configuration the thickness of the gasket lying between the duct coupling and the duct is generally constant along the length of the inner surface.

2. The HVAC duct coupling of claim 1 wherein the bead formed on the duct coupling abuts the end of the HVAC duct when the duct is connected to the duct coupling.

3. The HVAC duct coupling of claim 1 wherein the gasket includes opposed ends and wherein when in the expanded configuration one end of the wedge-shaped gasket assumes a concaved shape.

4. The HVAC duct coupling of claim 3 wherein when in the expanded configuration the concave-shaped end assumes a height greater than the height of the other end such that the outer surface of the gasket generally slopes downwardly from the concaved-shaped end to the other end.

5. The HVAC duct coupler of claim 1 including an adhesive strip for securing the gasket to the gasket seat.

6. The HVAC duct coupling of claim 5 wherein the adhesive strip is secured to the wedge-shaped gasket and includes an adhesive side for engaging the gasket seat.

7. An HVAC duct coupling for connecting one or more HVAC ducts, said duct coupling comprising:

a. at least one end;

b. a raised bead extending around the duct coupling adjacent the end;

c. a gasket seat formed on one side of the bead and including a circumferential indention formed in and extending around the duct coupling;

d. a gasket disposed in the gasket seat and extending around the duct coupling, said gasket including an outer surface;

e. the gasket normally assuming a wedge-shaped and an expanded configuration when the duct coupling assumes an uncoupled state, and assuming a compressed configuration when the duct coupling assumes a coupled state;

f. wherein the gasket includes an inner surface that rests adjacent the gasket seat and wherein when the gasket assumes the expanded configuration the outer surface of the wedge-shaped gasket is inclined downwardly toward the adjacent end of the duct coupling, and projects past the inner surface such that an open area is defined below a portion of the outer surface;

g. wherein when the duct coupling assumes a coupled state and is connected to at least one duct, the gasket lies between the duct coupling and the duct in the compressed configuration and forms a seal between the duct coupling and the duct; and h. wherein when the gasket assumes the wedge-shaped and expanded configuration, the open area defined below a portion of the outer surface overlies the circumferential indention formed in the duct coupling.

8. The HVAC duct coupling of claim 7 wherein the gasket includes opposed ends and wherein when in the expanded configuration one end of the wedge-shaped gasket assumes a concaved shape.

9. The HVAC duct coupling of claim 7 wherein the bead formed on the duct coupling abuts the end of the HVAC duct when the duct is connected to the duct coupling.

10. The HVAC duct coupling of claim 8 wherein when in the expanded configuration the concave shaped end assumes a height greater than the height of the other end such that the outer surface of the gasket generally slopes downwardly from the concaved shaped end to the other end.

11. The HVAC duct coupling of claim 7 wherein when in the compressed configuration the thickness of the gasket lying between the duct coupling and the duct is generally constant along the length of the inner surface.

12. The HVAC duct coupling of claim 7 wherein the indention includes a pair of spaced apart edges and wherein when the gasket assumes the compressed configuration, the gasket is confined to an area that lies between the two edges.

13. An HVAC coupling assembly comprising:

a. a first conduit;

b. a second conduit;

c. a gasket for fitting around the first conduit and forming a seal when the second conduit is joined with the first conduit;

d. the gasket normally assuming an expanded configuration and in the expanded configuration the gasket assumes a wedge-shape and includes an inner surface and an outer sloped surface that projects past the inner surface and forms an open area below a portion of the outer surface;

e. wherein when the first and second conduits are joined together, the first and second conduits cooperate to compress the gasket between the conduits and cause the gasket to assume a compressed configuration between the two conduits such that a seal is formed by the compressed gasket; and f. wherein in the compressed configuration substantially the entirety of the gasket is compressed by the first and second conduits.

14. The HVAC coupling assembly of claim 13 wherein the gasket includes opposed ends, and when compressed between the first and second conduits, the thickness of the compressed gasket is generally equal throughout a substantial portion of the distance between the opposed ends.

15. The HVAC coupling assembly of claim 12 wherein in the expanded configuration the gasket includes opposed end portions with one end portion being elevated with respect to the other and wherein the elevated end portion includes a generally concave surface that extends around the gasket.

* * * * *